United States Patent
Dzikiewicz et al.

(10) Patent No.: US 8,190,622 B2
(45) Date of Patent: May 29, 2012

(54) DATA PICKER APPLICATION

(75) Inventors: Joseph Dzikiewicz, Alexandria, VA (US); Kerry Pearce, Leeburg, VA (US); Jason Garber, Vienna, VA (US)

(73) Assignee: Ubermedia, Inc., Pasadena, CA (US)

( * ) Notice: Subject to any disclaimer, the term of this patent is extended or adjusted under 35 U.S.C. 154(b) by 597 days.

(21) Appl. No.: 12/346,908

(22) Filed: Dec. 31, 2008

(65) Prior Publication Data

US 2009/0193023 A1    Jul. 30, 2009

Related U.S. Application Data

(60) Provisional application No. 61/020,478, filed on Jan. 11, 2008.

(51) Int. Cl.
    *G06F 17/30*      (2006.01)

(52) U.S. Cl. ......................................... 707/755; 707/802

(58) Field of Classification Search ............... 707/100; 715/515

See application file for complete search history.

(56) References Cited

U.S. PATENT DOCUMENTS

| | | | | |
|---|---|---|---|---|
| 6,072,461 | A * | 6/2000 | Haran | 345/629 |
| 6,643,641 | B1 * | 11/2003 | Snyder | 707/709 |
| 6,708,186 | B1 * | 3/2004 | Claborn et al. | 707/754 |
| 7,092,569 | B1 * | 8/2006 | Kinjo | 382/190 |
| 7,379,591 | B2 * | 5/2008 | Kinjo | 382/170 |
| 7,508,998 | B2 * | 3/2009 | Shiiyama | 382/305 |
| 7,719,481 | B2 * | 5/2010 | Gormish | 345/2.1 |
| 2003/0048272 | A1 * | 3/2003 | Gormish | 345/428 |
| 2007/0174764 | A1 * | 7/2007 | Roseway et al. | 715/515 |
| 2009/0150203 | A1 * | 6/2009 | Baudisch et al. | 705/8 |

OTHER PUBLICATIONS

Written Opinion in PCT/US08/88589 issued Feb. 23, 2009.*
International Search Report in PCT/US08/88589 issued Feb. 23, 2009.

* cited by examiner

*Primary Examiner* — Sheree Brown

(57) ABSTRACT

A data picker system configured to allow a user to select data from a data site for submission to a data repository comprises an interface unit configured to provide a user with an interface for the user to input location information of a data site, a parsing unit configured to parse data in the data site and extract a data set from the data site, a selection mechanism configured to permit the user to select at least a portion of the extracted data set, and a processing unit configured to process at least a portion of the extracted data set selected by the user.

15 Claims, 5 Drawing Sheets

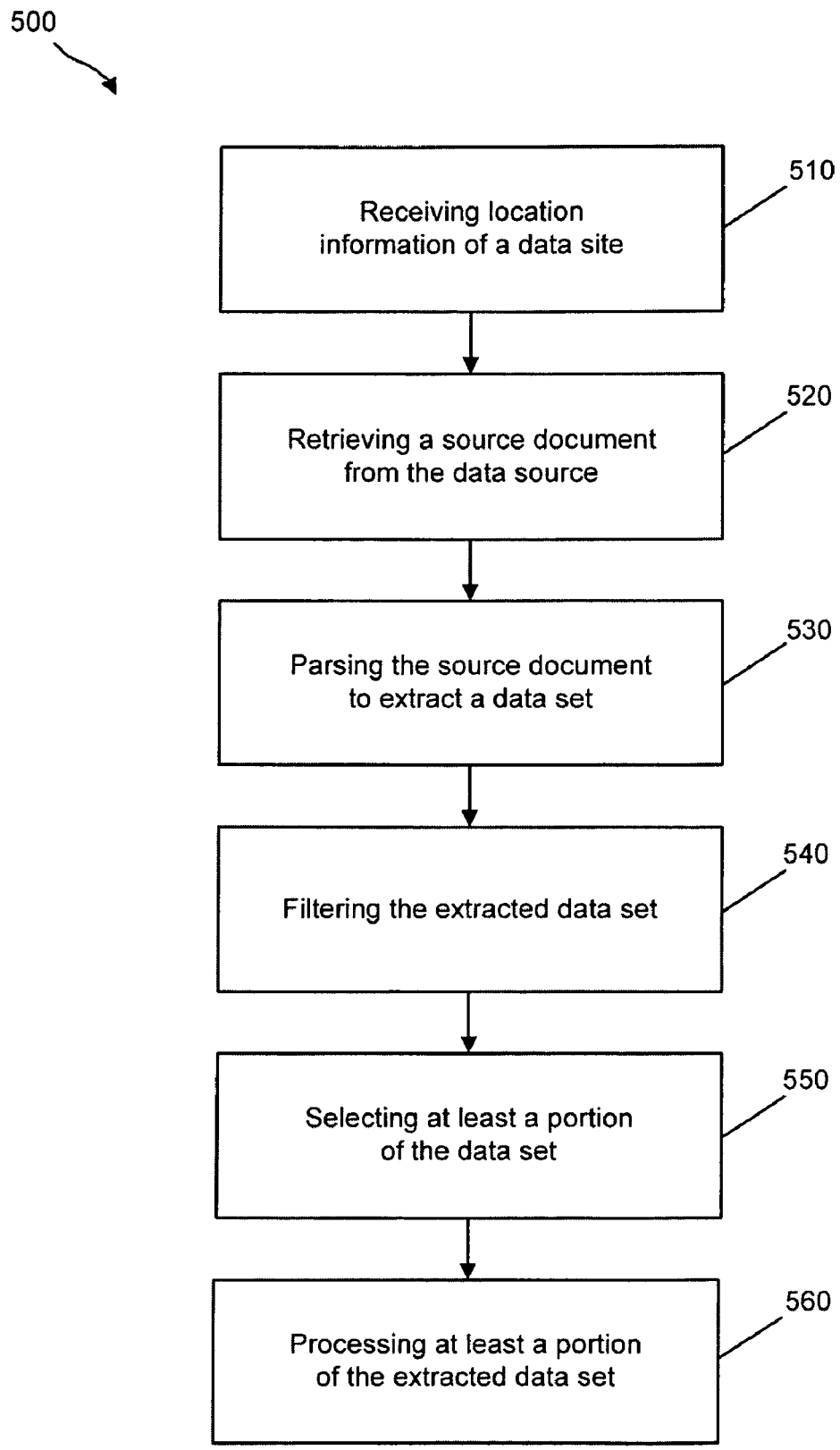

DATA PICKER APPLICATION

CROSS-REFERENCE TO RELATED APPLICATIONS

This application is based on and derives the benefit of the filing date of U.S. Provisional Patent Application No. 61/020,478, filed Jan. 11, 2008. The entire content of this application is herein incorporated by reference in its entirety.

FIELD OF THE INVENTION

The present disclosure generally relates to a data picker application.

BRIEF DESCRIPTION OF THE DRAWINGS

Reference is made to the attached drawings, wherein elements having the same reference designations represent like elements throughout wherein:

FIG. 5 is a flow chart illustrating a method for picking data from a data site according to an exemplary disclosed embodiment;

DETAILED DESCRIPTION OF SEVERAL EMBODIMENTS

Figure 1:
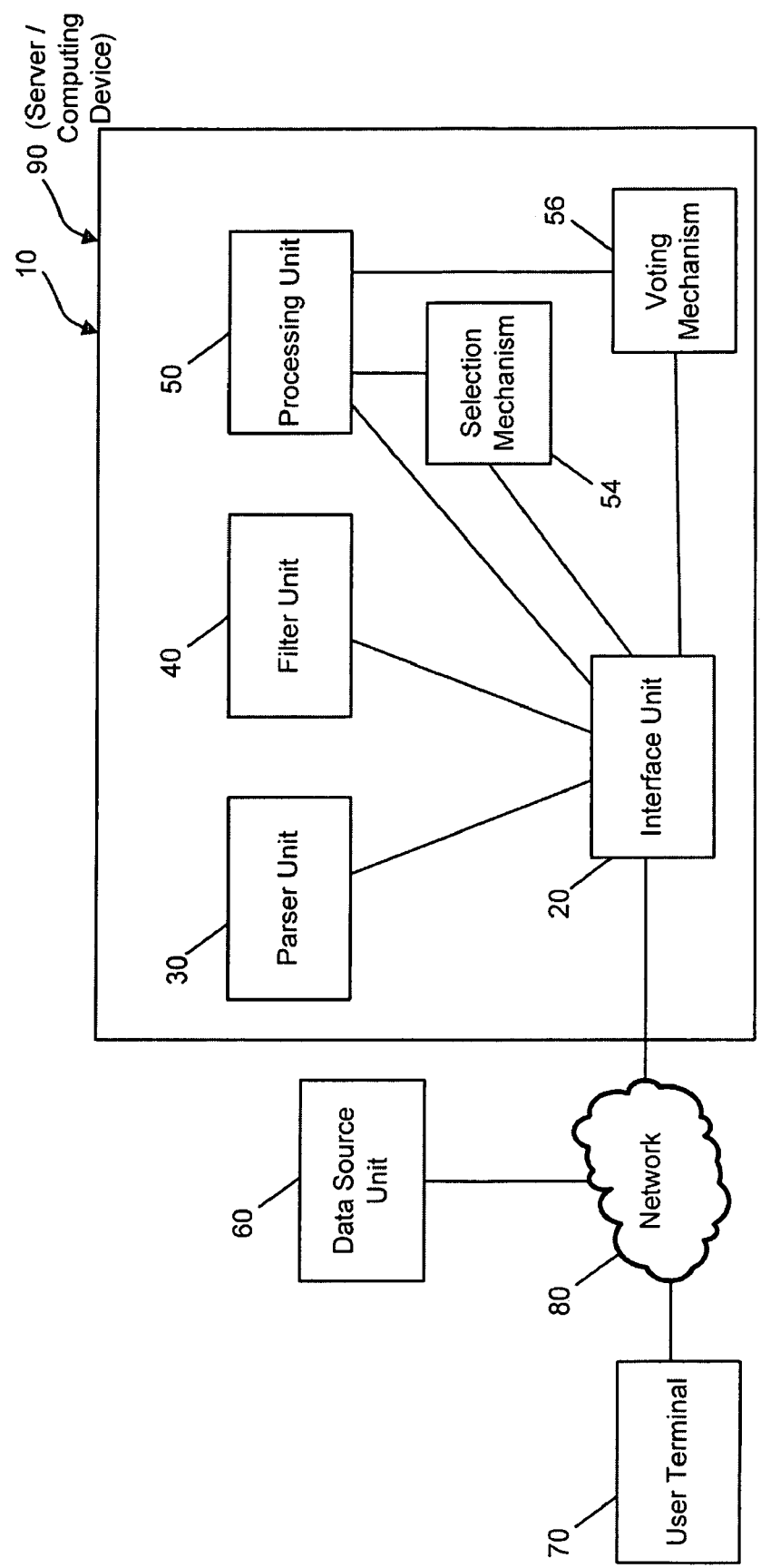
FIG. 1 is a block diagram illustrating a Data Picker system according to an exemplary disclosed embodiment.

FIG. 1 is a block diagram illustrating a Data Picker system 10 according to an exemplary disclosed embodiment. Data Picker system 10 includes an interface unit 20, a parser unit 30, a filter unit 40, a processing unit 50, a selection mechanism 54, and a voting mechanism 56. System 10 may connect to a data source unit 60 and user terminal 70 via network 80. Furthermore, the functionality of interface unit 20, parser unit 30, filter unit 40, processing unit 50, selection mechanism 54, and voting mechanism 56 may be incorporated into a server/computing device 90.

Generally, a user of system 10 may input location information of a data site to interface unit 20 via user terminal 70. This data site may include data that the user intends to retrieve. Interface unit 20 receives this location information from the user and, based on this information, retrieves a source document from data source unit 60. Data source unit 60 is located at the data site whose location information is provided by the user to interface unit 20. The source document may include the information the user intends to retrieve.

The retrieved source document may be provided to parser unit 3Q. Parser unit 30 may parse the retrieved source document to extract a data set from the source document. Parser unit 30 may perform this extraction based on a selection criteria provided by the user to interface 20. Additionally, the output of parser unit 30 may be provided to filter unit 40. Filter unit 40 may filter the data extracted by parser unit 30 to provide a data set that meets certain criteria. These criteria may be set by the user and/or system 10. The output of filter unit 40 may then be provided to the user. The user may use selection mechanism 54 via interface unit 20 to select a portion of the data set. The user may select the portion of the data set based on any criteria desired by the user. Furthermore, the portion of the data set selected by the user may be provided to processing unit 50. Processing unit 50 may process the data selected by the user from the given data set and place the processed data in a data repository.

The data placed in the data repository may be displayed to other users of the data repository. These other users may have played no part in the selection of the data placed in the data repository. However, system 10 may permit such users to vote on the data displayed to them. Specifically, other users of system 10 may use voting mechanism 56 via interface unit 20 to vote on the data placed in the data repository. Based on the votes received for the data displayed, system 10 may order the data displayed. This ordering may be based on various ordering schemes. For example, in one scheme, the data that receives the highest number of votes may be placed on the top in their respective categories.

Interface unit 20 may be configured to provide the user with an interface to communicate with system 10. In addition, interface unit 20 may be configured to interact with data source unit 60, user terminal 70, and the other components of system 10. The other components of system 10 include parser unit 30, filter unit 40, processing unit 50, selection mechanism 54, and voting mechanism 56. For example, interface unit may be configured to manage the flow of information throughout system 10, between a user and system 10, and also between data source unit 60 and system 10. In an exemplary embodiment, interface 20 may be configured to provide a user with a Graphical User Interface (GUI) so that the user may input location information of a data site to interface 20. The GUI may also be configured to permit the user to select data from the data set offered to the user by filter 40. Furthermore, the GUI may be provided to other users to vote on the data selected by the user. In addition, the GUI may be used by the user to communicate any other kind of information to interface 20.

In an exemplary embodiment, interface 20 may be a server or any other computing device running software that performs the functions discussed above. The server may be configured as a Windows-based server. Alternatively, the server may be configured as a LINUX or UNIX-based server. In addition, the server may run any other operating system compatible with software that performs the functions discussed above.

Data source unit 60 may be present at the data site whose location information is provided by the user to interface unit 20. In an exemplary embodiment, data source unit 60 may be a web site whose location information is provided by a user to interface unit 20. Specifically, this location information may be provided by a user via user terminal 70 to interface unit 20. This location information may be in the form of a Universal Resource Locator ("URL"). An URL is an Internet World Wide Web Address. Alternatively, data source unit 60 could be another type of holder of items such as, for example, a document database. In addition, data source unit 60 may be any other form of data storage medium that is configurable to provide data upon receipt of a request for data.

Data source unit 60 may be configured to provide a source document to interface 20 upon receipt of a request for the source document from interface 20. As discussed above, interface 20 may generate this request in response to an input from a user that requires data contained in the source document. Interface unit 20 may communicate with data source unit 60 using a variety of communication protocols. In an exemplary embodiment, data source unit 60 may provide the source document in response to a "HTTP ('Hyper Text Transfer Protocol) GET" request from interface unit 20. Alternatively, data source unit 60 may provide the source document to interface 20 in response to a FTP (File Transfer Protocol) or TFTP (Trivial File Transfer Protocol) request. In addition, any other communication protocol capable of transferring data from one device to another may be used to transfer the source document from data source unit 60 to interface 20.

In an exemplary embodiment, the source document transferred from data source unit 60 to interface 20 may include data in HTML (Hyper Text Markup Language) format. Alternatively, the source document may be in XML (Extensible Markup Language) format or SGML (Standard Generalized Markup Language) format. In addition, the source document may be in any other language permitting the transfer of structured documents and data from one device to another.

Parser unit 30 may be configured to parse the source document provided by data source unit 60 to interface unit 20. Parser unit 30 may be of different types. Furthermore, the type of parser unit 30 may depend on the type of source document provided to interface unit 20. In an exemplary embodiment, parser unit 30 may be a HTML parser if the source document provided to interface unit 20 is a HTML document. Furthermore, parser unit 30 may parse the retrieved source document to extract a data set from the source document. In particular, parser unit 30 may be configured to parse for data based on a selection criteria input by the user.

For example, if the retrieved source document is in HTML format, and the user desires to select an image from the retrieved source document, parser unit 30 may parse the source document by identifying all the images on the source document. The parser may identify all the images on the source document by finding <IMG> tags on the source document. Additionally, upon identification of all the images on the source document, parser unit 30 may extract all the images and provide them as a data set to interface 20. Alternatively, if a user desires to select paragraphs of text from the retrieved source document, parser unit 30 may extract a data set based on <p> tags in the retrieved HTML source document. In another exemplary embodiment, parser unit 30 may extract a data set of videos on the retrieved source document based on the appropriate tags in the source document. In addition, parser unit 30 may extract any other class of data based on appropriate identifiers in the source document In an exemplary embodiment, the data set extracted by parser unit 30 may be presented to the user. Furthermore, the user may be permitted to further select a sub-set of data from the data set presented to the user. Specifically, the data set may be presented to the user in the form of a HTML page along with markup that allows the user to select a sub-set of data from the data set. For example, if the user desires to select one of the images from a URL, interface unit 20 may provide a HTML, page to the user. This HTML page may include a set of images extracted by parser unit 30 from the source document retrieved from data source unit 60. Furthermore, the HTML page may also include markup that allows the user to select one or more images from the set of images displayed on the HTML page. The sub-set of images that are selected by the user may then be sent to processing unit 50 for further processing.

In an exemplary embodiment, a filter unit 40 may also be used in Data Picker system 10. Specifically, instead of directly providing the output of parser unit 30 to the user, the data extracted by parser unit 30 may first be provided to filter unit 40. Filter unit 40 may filter the data extracted by parser unit 30 to provide a data set that meets certain criteria. These criteria may be set by the user and/or system 10. Furthermore, filter unit 40 may filter the extracted data based on different filtering schemes. In one scheme, filter unit 40 may filter the extracted data based on information included in the meta data associated with the extracted data. In another scheme, filter unit 40 may filter the extracted data based on the type of data itself. In addition, any other filtering scheme may be used to filter the extracted data.

In an exemplary embodiment, filter unit 40 may filter the extracted data based on meta data present in the source document. For example, the data extracted by parsing unit 30 may be image data. Furthermore, there may be criteria to provide images to a user that are only above or below a certain size and/or above or below a certain resolution. In addition, the corresponding <IMG> tag associated with each image may include the size and/or the resolution of that particular image. In this case, filter unit 40 may filter out the image based on the contents of the <IMG> tag of that particular image if the size and/or resolution of the image do not meet the required criteria.

Alternatively, in another scheme, filter unit 40 may filter data extracted by parser unit 30 by examining the data itself rather than relying on the meta data associated with the data. For example, the data extracted by parsing unit 30 may be image data. In this scheme, all the images may be actually examined based on criteria such as, for example, image size and image resolution. Furthermore, based on the examination, only images matching the criteria set in system 10 may be presented as a data set to the user, the rest of the images being filtered out by filter unit 40.

Data filtered by filter unit 40 may be presented to a user. Alternatively, data set extracted by parser unit 30 may be directly presented to the user. In either case, data presented to the user may form a data set. The user may then use selection mechanism 54 to select a portion of the data set. In an exemplary embodiment, selection mechanism 54 may be configured to take the sub-set of data selected by the user and provide this sub-set of data to processing unit 50. Processing unit 50 may process the selected data and place the processed data in a data repository. For example, if the data to be selected is image data, a user may select an image from a data set including a number of images. In particular, the user may depress a "select" button provided in a GUI via interface 20 to select a particular image. Selection mechanism 54 may then transfer the image selected by the user to processing unit 50. Processing unit 50 may perform some processing on this selected image and place the selected in a data repository.

Processing unit 50 may perform a variety of processing on the data selected by the user. For example, if the data selected is an image, processing unit 50 may scale the selected image to a predetermined size. Furthermore, the scaled image may also be cropped to a predetermined shape if desired. In addition, this processed image may be placed at a predetermined location in a data repository. In an exemplary embodiment, the size of the scaled image and the shape of the cropped image may be based on parameters set in Data Picker system 10. These parameters may be set by a user and/or the developer of system 10.

System 10 may also include voting mechanism 56. Voting mechanism 56 may be configured to permit other users to vote on the data that is selected by the user and placed in the data repository. In an exemplary embodiment, other users may view the data via a web site configured to access and display the data stored in the data repository. In addition, these users may use voting buttons on the web site to cast their votes for data displayed on the web site. Specifically, these users may view the web site and cast their vote via interface unit 20. Upon receiving a vote, voting mechanism 56 may update a table or any other such data structure in a database that keeps a tally of the number of votes received for the data. This updating may be done via processing unit 50. Furthermore, based on the votes received, system 10 may order the data displayed.

For example, other users may want to vote on a set of images displayed on a web site via interface 20. This web site may access the images stored in a data repository and display these images to the users. In order to cast their votes, these users may use voting buttons placed besides each image displayed on the web site. Specifically, the users may use an up arrow on the voting button to cast a positive vote and a down arrow to cast a negative vote. Upon receiving a vote, voting mechanism 56 may update a table or any other such data structure in a database that stores the number of positive and negative votes received for each image. Based on the number of votes tallied in the database, system 10 may order the images displayed. For example, an image that receives the highest number of positive votes may be placed on the top in the data repository such that it is the first image displayed on the web site.

In an exemplary embodiment, the data repository is a database that may be accessed by a web site configured to display data selected by the user. In addition, the data repository may be any other type of data container configured to store data selected by the user and processed by processing unit 50.

The functionality of interface unit 20, parser unit 30, filter unit 40, processing unit 50, selection mechanism 54, and voting mechanism 56 may be obtained in software, hardware, or a combination of both software and hardware. In an exemplary embodiment, the entire functionality of Data Picker system 10 may be configured in a software application. This software application may be configured to run on any computing device. This computing device may include, for example, a Central Processing Unit (CPU), a Random Access Memory (RAM), a Read Only Memory (ROM), and an I/O unit. Furthermore, the software application may be written in Ruby on Rails or any other such language that allows for the rapid development of web applications.

Alternatively, the entire functionality of Data Picker system 10 may be configured in hardware. That is, the functionality of interface unit 20, parser unit 30, filter unit 40, processing unit 50, selection mechanism 54, and voting mechanism 56 may be obtained by designing hardware specifically fabricated for Data Picker system 10. This may be done by, for example, designing Application Specific Integrated Circuits (ASICs), embodying the functionality of Data Picker system 10. In yet another exemplary embodiment, the functionality of Data Picker system 10 may be obtained by using a combination of hardware and software.

In an exemplary embodiment, interface unit 20, parser unit 30, filter unit 40, processing unit 50, selection mechanism 54, and voting mechanism 56 may all be part of one physical device, i.e., one chassis. In fact, the functionality performed by these units may be executed on one processor or one computer. Alternatively, interface unit 20, parser unit 30, filter unit 40, processing unit 50, selection mechanism 54, and voting mechanism 56 may be spread across multiple physical devices in any combination. For example, interface unit 20 may be part of one physical device and parser unit 30, filter unit 40, processing unit 50, selection mechanism 54, and voting mechanism 56, may be part of another physical device. In addition, any other combination of interface unit 20, parser unit 30, filter unit 40, processing unit 50, selection mechanism 54, and voting mechanism 56 may be used on multiple physical devices to obtain the functionality of Data Picker system 10.

As shown in FIG. 1, the functionality of interface unit 20, parser unit 30, filter unit 40, processing unit 50, selection mechanism 54, and voting mechanism 56 may be embedded in server/computing device 90. That is, server/computing device 90 may include an application that performs the functionality of Data Picker system 10 as disclosed above. In addition, server/computing device 90 may connect to data source unit 60 and user terminal 70 via network 80.

User terminal 70 may be any device that allows a user to connect to server/computing device 90. In an exemplary embodiment, a computing device may constitute user terminal 70. This computing device may be a Personal Computer, a laptop, a Macintosh, a UNIX machine or any other device capable of permitting a user to connect to server/computing device 90 via network 80. Furthermore, user terminal 70 may also include input devices such as, for example, a mouse and a keyboard, that a user may use to enter location information of a data site that includes data source unit 60. In addition, the user may also use the input devices to select a portion of the data set offered by server/computing device 90.

Network 80 may be a collection of one or more data paths that connect user terminal 70 to server/computing device 90 and also connect data source unit 60 to server/computing device 90. In an exemplary embodiment, network 80 may be a publicly available network such as the Internet. Alternatively, network 80 may be a private network or a Virtual Private Network (VPN) that is formed over the Internet. Furthermore, network 80 may connect to user terminal 70 on one end and server/Computing device 90 on the other end via one or more network connection such as, for example, a cable modem, a DSL (Digital Subscriber Link) connection, Ethernet, Gigabit Ethernet, T1, T3, OC-3, OC-12, or any other such network connection that can connect a computing device or server to a network.

Network 80 may connect to data source unit 60 on one end and server/computing device 90 on the other end in a manner similar to the one described above for the connection between user terminal 70 and server/computing device 90. That is, a connection such as, for example, a cable modem, a DSL (Digital Subscriber Link) connection, Ethernet, Gigabit Ethernet, T1, T3, OC-3, OC-12, or any other such network connection may be used by network 80 to connect to data source unit 60 on one end and server/computing device 90 on the other end.

Furthermore, in response to location information provided by the user via user terminal 70, the application running on server/computing device 90 may retrieve the corresponding source document from data source unit 60. In addition, the application running on server/computing device 90 may parse and filter the required information from the source document retrieved from data source unit 60. This parsed and filtered information may be offered as a data set to the user via user terminal 70. Specifically, the application on server/computing device 90 may display the extracted data set to the user. The user may then select at least a portion of the data set as the data that needs to be deposited and/or displayed in a data repository. The application running on server/computing device 90 may process the selected data and place the processed data in a data repository. In addition, the application may permit other users to vote on the data deposited and/or displayed in the data repository. The processes of parsing, filtering, and processing have been described above. Therefore, a repetitive description of these processes has been omitted in the interests of brevity.

Figure 2:
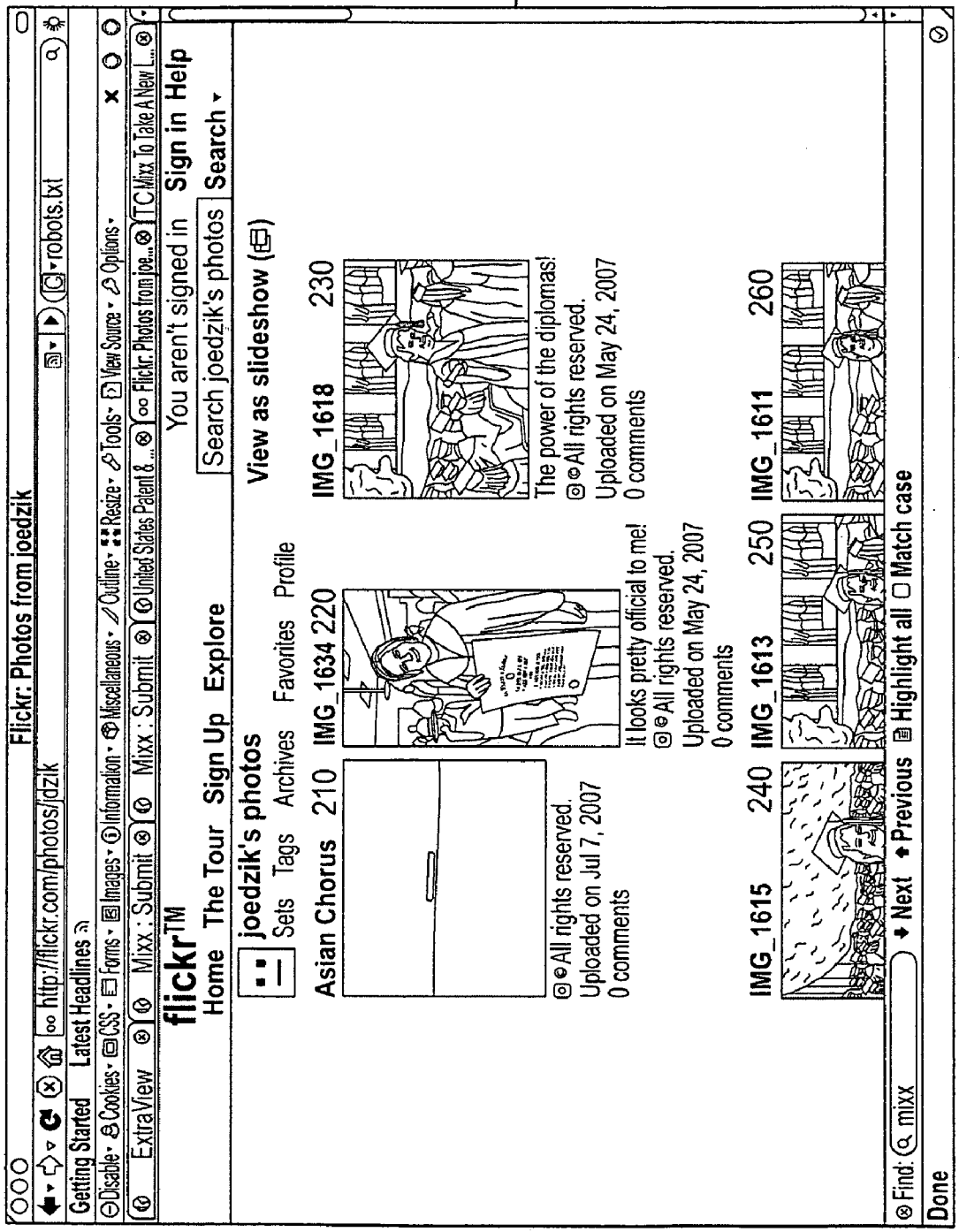
FIG. 2 is a screen shot of a data site from where the disclosed Data Picker system picks data according to an exemplary disclosed embodiment.

FIG. 2 is a screen shot of a data site 200. Data site 200 includes data selectable by a user for submission to a data repository. As shown in FIG. 2, in an exemplary disclosed embodiment, data site 200 is a web site. In particular, data site 200 is a web site that includes a source document which includes a number of images 210-260. A user may provide the URL of the web site as an input to system 10 of FIG. 1. As shown in FIG. 2, in response to the user's input, data site 200 may be accessed to extract one or more of images 210-260 from data site 200.

Figure 3:
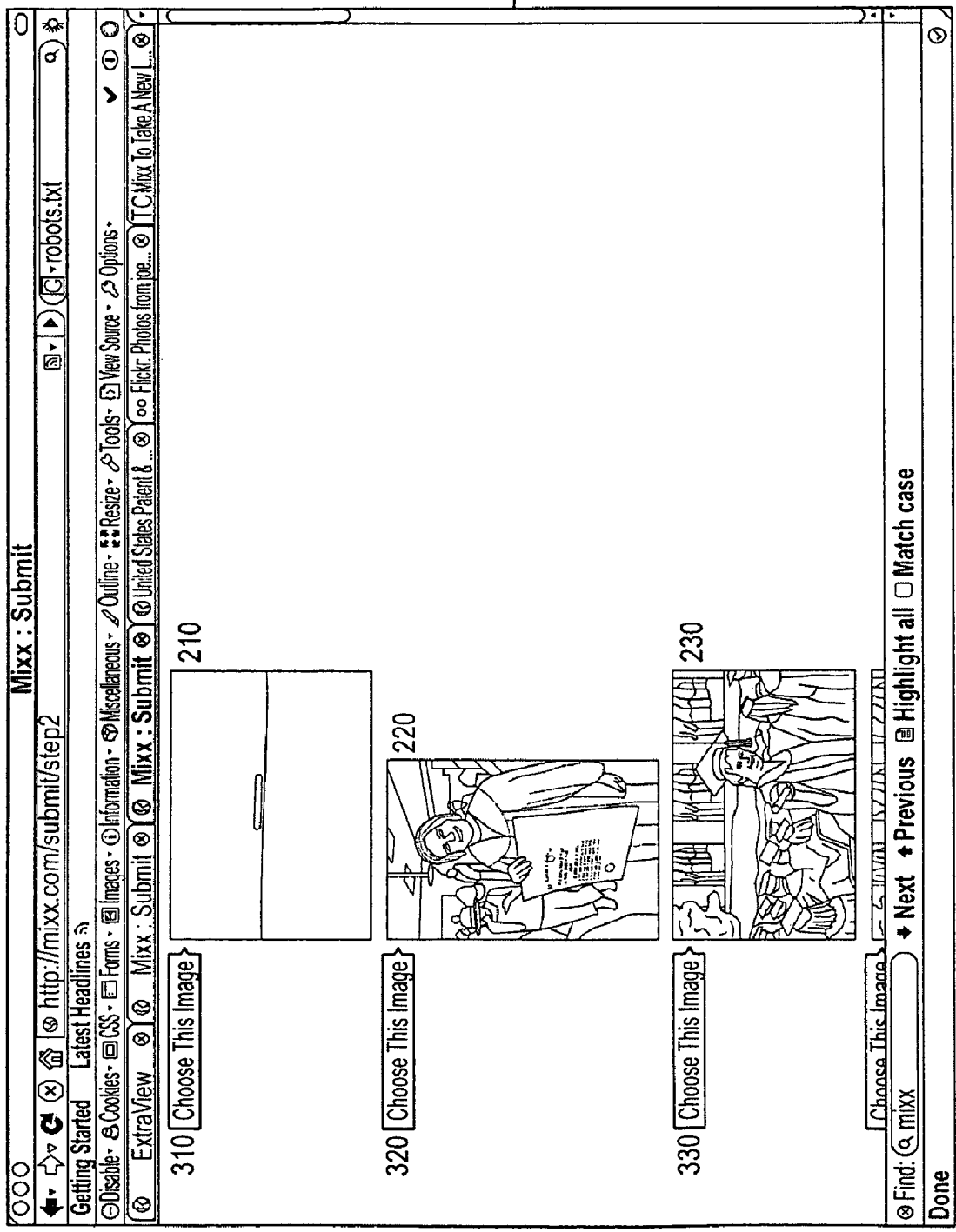
FIG. 3 is a screen shot of an extracted data set presented to a user according to an exemplary disclosed embodiment.

FIG. 3 is a screen shot of a display mechanism 300 configured to display a data set extracted from a data site. In an exemplary embodiment, as shown in FIG. 3, display mechanism 300 is a web site configured to display a data set extracted from a data site whose location information is provided by a user to the disclosed system. This web site may be displayed to a user by interface unit 20. For example, assuming that a user provided the URL of web site 200 disclosed in FIG. 2, then the disclosed system may create web site 300 as shown in FIG. 3 that is displayed via interface unit 20 to the user. Specifically, web site 300 may include images 210-260 (240-260 not shown) extracted by parser unit 30 from web site 200 of FIG. 2. That is, web site 300 only displays images 210-260 that are extracted from web site 200, and not any of the text surrounding images 210-260 on web site 200. In other words, images 210-260 are extracted by the disclosed system from web site 200 and displayed to the user via web site 300. While the snap shot in FIG. 3 only displays images 210-230, images 240-260 will also be visible to the user upon scrolling down on web site 300.

Web site 300 also interfaces with selection mechanism 54 configured to permit the user to select at least a portion of the extracted images 210-260. In an exemplary embodiment, web site 300 may include selection buttons 310-360 (340-360 not shown). Each selection button 310-360 may be used to select a corresponding image. Specifically, selection button 310 may be used to select image 210 on web site 300. Similarly, selection buttons 320-360 may be used to select images 220-260, respectively. A user may select one or more of images 210-260 by using a corresponding selection button. Selection mechanism 54 may be configured to transfer the selected image to processing unit 50.

Images selected by a user from web site 300 may be processed by processing unit 50 and placed in a data repository. This data repository may be configured to hold the selected images. In addition, the data repository may be configured to permit other users to vote on the selected images via a display such as, for example, a web site. Furthermore, based on the votes received, an image may be ordered around in the data repository. For example, an image that receives the highest votes from other users may be ordered to the very top of the data repository.

Figure 4:
FIG. 4 is a screen shot of a display mechanism configured to display data selected by a user according to an exemplary disclosed embodiment.

FIG. 4 is a screen shot of a display mechanism 400. Display 400 accesses a data repository that holds images selected from web site 300 of FIG. 3 and displays the accessed images to users. As shown in FIG. 4, in an exemplary embodiment, display 400 may be a web site configured to display images selected by a user. As also shown in FIG. 4, image 210 that was displayed on web site 300 in FIG. 3 to the user and was also selected by the user from web site 300, is now processed and displayed as FIG. 410 on web site 400. In addition, web site 400 also includes images 420 and 430. Images 420 and 430 are images that may have been previously selected by the user or other users from other data sites. Web site 400 may also include information about each image published on web site 40. This information may include, for example, a title for the image, the date and time of submission of the image to web site 400, and also the name/user id of the user who actually selected the image for submission to web site 400. In addition, web site 400 may also interface with voting mechanism 56. As discussed above, voting mechanism 56 may be configured to permit other users to vote on images selected by the user and displayed on web site 400.

In an exemplary embodiment, as also shown in FIG. 4, display 400 may include voting buttons 440-460. Each voting button 440-460 may be used to vote on a corresponding image. Specifically, voting button 440 may be used by other users to vote on image 410. Similarly, voting buttons 450 and 460 may be used to vote on images 420 and 430, respectively. As mentioned above, the image that receives the highest number of votes may be moved to the top of the image list on web site 400. For example, a user may interface with display 400 via interface unit 20 and use voting buttons 440-460 to vote on images 410-430, respectively. As each vote is received, voting mechanism 56 may update a table or any other such data structure in a database that keeps a tally of the number of votes received for each image 410-430. Specifically, voting mechanism 56 may perform such updates via processing unit 50. Based on the number of votes received, images 410-430 may be ordered on display 400. This ordering may also be performed by processing unit 50. For example, if image 410 receives the maximum number of votes, then processing unit 50 may place image 410 on top of all the other images on display 400.

While FIGS. 2-4 illustrate the extraction, selection, and submission of image data to a data repository, one skilled in the art will appreciate that a similar mechanism may be used to extract, select, and submit other kinds of data to a data repository without departing from the scope of the disclosure. These other kinds of data may include, for example, video data and text data.

FIG. 5 is a flow chart illustrating a method for picking data from a data site according to an exemplary disclosed embodiment. At step 510, interface unit 20 may receive information about a data site from a user. This information may be in the form of, for example, a web site address of the data site. In addition, any other type of information specifying the location of the data site may be provided at step 510. The user may input this information through a GUI offered by interface unit 20. Alternatively, any other input mechanism may be used to input information about the data site to interface unit 20.

At step 520, interface unit 20 retrieves a source document from the data site. This is the data site whose information is input by the user to interface unit 20 at step 510. In an exemplary embodiment, the source document may be stored in data source unit 60 that is located at the data site. As discussed above, interface unit 20 may use a variety of communication protocols to retrieve the source document from the data site. These communication protocols may include, for example, HTTP, FTP, and TFTP. In an exemplary embodiment, interface unit 20 may use the "HTTP GET" command to retrieve a source document from the data site. As also discussed above, the source document retrieved from data source unit 60 may be in any language such as, for example, HTML, XML, and SGML, that permits the transfer of structured documents and data from one device to another.

At step 530, parser unit 30 may parse the document retrieved at step 520. The type of parsing performed may depend on the type of source document retrieved from data source unit 60. Thus, for example, if the retrieved source document is a HTML document, HTML parsing is performed at step 530. Furthermore, parser unit 30 may parse based on meta data information included in the source document. For example, if a user desires to select images from the source document, parser unit 30 may parse the source document for images based on an <IMG> tag included in the source document. The output of parser unit 30 may be an extracted data set. This extracted data set may include all the type of data that the user intends to extract from the source document. For example, if the user intends to extract one or more images from the source document, the output of parser unit 30 is all the images included in the source document.

At step 540, the data set extracted at step 530 is filtered by filter unit 40. In this filtering process, information is filtered and the resulting output of the filter unit 40 is at least a portion of the extracted data set. As discussed above, the filtering may be performed according to various criteria set by the user and/or Data Picker system 10. These criteria may include, for example, an image size or image resolution (if the data to be selected is image data). The filtering process may be performed by using one of a variety of filtering schemes. As discussed above, these filtering schemes may include, for example, filtering based on the meta data present in the source document and filtering based on the contents of the extracted data itself. In addition, any other filtering scheme capable of filtering data extracted by parser unit 30 may also be used at step 540.

At step 550, a user of system 10 may select at least a portion of the data set extracted and filtered at steps 530 and 540, respectively. In an exemplary embodiment, the user may make the selection via a GUI presented to the user by interface 20. Specifically, the extracted and filtered data may be presented on a HTML page along with markup allowing the user to select at least a portion of the data. In addition, any other selection mechanism may be used to allow the user to select at least a portion of the data presented.

The data selected by the user at step 550 is processed at step 560. In an exemplary embodiment, processing unit 50 may perform different types of processing on the data selected by the user. Assuming that the user selects an image at step 550, then at step 560, the processing may include scaling the selected image. The processing may also include cropping the scaled image to a desired shape and placing the scaled and cropped image at a location in a data repository. One skilled in the art will appreciate that steps 510 through 560 may be repeated any number of times without departing from the scope of this disclosure.

By using the above-disclosed Data Picker System, a user can select data from any data site and submit the selected data to a data repository. In addition, the disclosed system may perform certain predetermined processing on the selected data before placing the selected data in a data repository. Furthermore, the disclosed system may include certain criteria that the data retrieved from the data site needs to meet before the retrieved data is presented to the user for selection. By performing the functionality discussed above, the disclosed system may allow users to share items found on the web. In addition, other users may vote for their items. Furthermore, items that receive the most votes may be placed at the top of their respective content categories. While the present disclosure discusses exemplary embodiments, it will be appreciated and understood that modifications may be made without departing from the scope of the disclosure.

What is claimed is:

1. A data picker system configured to allow a user to select data from a data site for submission to a data repository, the data picker system comprising:

an interface unit configured to provide a user with an interface for the user to input location information of a data site;

a parsing unit configured to parse data in the data site and extract a data set from the data site, wherein the extracted data set consists of a plurality of images that satisfy a predetermined size criteria;

a selection mechanism configured to permit the user to select two or more of the plurality of images in the extracted data set;

a processing unit configured to process at least a portion of the two or more images of the extracted data set selected by the user, wherein processing comprises resizing at least one image;

a data repository for storing the two or more images selected with the selection mechanism;

a voting mechanism configured to collect votes from other users, each vote being associated with one of the two or more images selected with the selection mechanism; and a display mechanism configured to display the two or more images selected with the selection mechanism in accordance with the collected votes.

2. The data picker system of claim 1, further including a data source unit located at the data site, the data source unit being configured to provide a source document in response to the input provided by the user to the interface unit, the source document including data extractable by the parsing unit.

3. The data picker system of claim 1, further including a filter unit configured to filter information parsed by the parsing unit, the output of the filter unit being at least a portion of the data set extracted from the data site.

4. The data picker system of claim 3, wherein the filter unit filters the information based on meta data present in the data site.

5. The data picker system of claim 4, wherein the meta data includes a size of the data included in the data site.

6. The data picker system of claim 1, wherein the processing unit processes the at least a portion of the extracted data set selected by the user by scaling an image selected by the user to a pre-determined size and placing the scaled image at a location in a data repository.

7. A method for picking data from a data site based on a user input and placing the picked data in a data repository, the method comprising:

receiving location information about a data site;

retrieving a source document from the data site;

parsing the source document;

filtering the parsed source document to extract a data set comprising image data;

processing at least a portion of the extracted data set, based on a selection made by a user, wherein processing comprises scaling an image selected to a pre-determined size;

receiving votes for the at least a portion of the extracted data set selected by the user; and based on the received votes, ordering the at least a portion of the extracted data set on a web site.

8. The method of claim 7, wherein the filtering of information includes filtering based on meta data present in the source document.

9. The method of claim 8, wherein the meta data includes a size of the data included in the source document.

10. The method of claim 7, wherein the parsing includes parsing the source document for image data.

11. The method of claim 7, wherein the processing at least a portion of the extracted data set includes scaling an image selected to a pre-determined size and placing the scaled image at a location in a data repository.

12. A computerized system for selecting data from a data site for submission to a data repository, the system comprising:

a server coupled to a network;

a processor disposed in the server and coupled to a user terminal over the network, the processor being configured for:
  receiving location information about a data site from the user terminal;
  retrieving a source document from the data site over the network;
  parsing the source document to extract a data set, the data set comprising image data;
  filtering the extracted data set based on meta data;
  permitting a user to select at least a portion of the filtered data set; and
  processing the at least a portion of the filtered data set selected by the user, wherein processing comprises scaling an image selected to a pre-determined size; and
  permitting other users to vote on the at least a portion of the filtered data set selected by the user.

13. The computerized system for claim 12, wherein the application is further configured for displaying the extracted data set to the user.

14. The computerized system of claim 12, wherein the meta data includes a size of the data included in the source document.

15. The computerized system of claim 12, wherein the processing at least a portion of the extracted data set includes scaling an image selected to a predetermined size and placing the scaled image at a location in a data repository.

* * * * *